United States Patent
Romero Magariño

(10) Patent No.: US 6,454,507 B1
(45) Date of Patent: Sep. 24, 2002

(54) METAL-PLASTIC SYSTEM FOR FIXING PIECES

(75) Inventor: Antonio Romero Magariño, Burgos (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 09/623,247

(22) PCT Filed: Dec. 31, 1998

(86) PCT No.: PCT/ES98/00364

§ 371 (c)(1),
(2), (4) Date: Oct. 24, 2000

(87) PCT Pub. No.: WO00/40866

PCT Pub. Date: Jul. 13, 2000

(51) Int. Cl.[7] ............................. F16B 19/00; F16B 21/00
(52) U.S. Cl. ......................... 411/508; 411/339; 411/913
(58) Field of Search ................................. 411/508, 509, 411/510, 913, 338, 339

(56) References Cited

U.S. PATENT DOCUMENTS

| 4,103,400 A | * | 8/1978 | Munse .................... 411/508 X |
| 4,865,505 A | * | 9/1989 | Okada .................... 411/508 X |
| 5,403,034 A | | 4/1995 | Gans et al. |
| 5,533,237 A | | 7/1996 | Higgins |
| 5,774,949 A | * | 7/1998 | Cornell et al. .......... 411/508 X |
| 5,803,532 A | * | 9/1998 | Karuppaswamy et al. ...................... 411/508 X |
| 6,074,150 A | * | 6/2000 | Shinozaki et al. .......... 411/508 |

FOREIGN PATENT DOCUMENTS

| GB | 836121 | 6/1960 |
| GB | 2317199 A | 3/1996 |
| JP | 8-334108 | 12/1996 |
| WO | WO 98/48179 | 10/1998 |

* cited by examiner

Primary Examiner—Neill Wilson
(74) Attorney, Agent, or Firm—Katten Muchin Zavis Rosenman

(57) ABSTRACT

In the system there participates one of the parts that is to be joined (8), sheet like, preferably of metallic nature, with a window (9), the other part that is to be joined (20), supplied with a shaft (10) of a plastic nature, and a staple, metallic and intermediate (1). The staple is composed of a first pair of tabs (2), with brackets (3) in their ends, that constitute the means for an elastic connection to a transversal beam (12) of the shaft (10), a second pair of tabs (4), pronouncedly divergent, finished off in "U" shaped folds (5), oriented outwards and designed for their connection, by elastic deformation, to the window (9) of the part (8), and a third pair of tabs (6–7) designed to support over the sheet (8) outside the window (9), being able to insert optionally, between these two pieces (8) and (20), an intermediate piece (21), as for example a panel. The system results particularly ideal for the coating of the interior of automobiles.

5 Claims, 3 Drawing Sheets

METAL-PLASTIC SYSTEM FOR FIXING PIECES

DESCRIPTION

Object of the Invention

The present invention refers to a fastening system between two or more parts or elements, in which one of them, taken as a base, acts as the principal support of the system, and as such must be metallic in nature, while the element that is to be fixed must possess a plastic shaft that, inserted in a metallic staple, completes the system. In such a way that the unit is left for its insertion through simple pressure or impact carried out over a window on the metallic base cited beforehand.

The system permits the direct fastening between the two elements previously cited, or either the insertion between them of a panel or the like, of any type of material or nature.

The object of the invention is to obtain an exceedingly fast and secure assembly, with a high grade of stability and great ease for dismantling.

The system may be applied in the furniture industry, in the construction of panelled surfaces, in the manufacturing of home electrical appliances and, particularly for the coating of the interior of automobiles, as well as in any industrial sector where you require similar features.

BACKGROUND OF THE INVENTION

Fastening systems between two or more parts are already known, systems that use a metallic staple, attachable by pressure, by elastic deformation, in a window that is operatively worked by one of said parts, that must be materialised in a sheet like body, like for example a metallic plate or a panel, being joined to the cited metallic staple a plastic shaft to which is joined, at the same time, to a second part.

Solutions of this type appear reflected in Spanish patent inventions No. 9700865 and No. 9700870, as well as Addition Certificates No. 9702231 and No. 9800689, all of which stand in the name of the present applicant.

All these registrations present as a common denominator a problem that is centred fundamentally in two aspects; on the one hand the surface for fastening is relatively small, so that the anchorage can be bettered, and on the other hand it presents dismantling problems, when it is required, which occurs habitually.

DESCRIPTION OF THE INVENTION

The metal-plastic fastening system between parts that the invention proposes resolves in a fully satisfactory manner the problem previously cited in the two aspects stated.

For this, and parting from the basic structure of conventional fastening systems, that is, parting from the existence of a base element, markedly plane, a metallic staple and a plastic shaft defined in the element that is to be fixed, the system of the invention uses a staple obtained by moulding and shaped by means of a metallic sheet, of iron, of a reduced thickness, duly tempered and treated with antirust protection. After the shaping of same, the staple adopts a symmetric configuration with respects to the middle axis, and more concretely through a ridge or common trestle, intermediate and rounded, there are three pairs of flexible tabs. The first pair forming a practically null angle, that is, being the tabs of same approximately parallel, each with creases or brackets that oppose each other in their free and inferior ends. The second pair of tabs forming an angle inferior to 90°, obtaining the first pair of tabs at the expense of forging the latter, the shafts of the second pair finish off, at their free end, through folds grooved into a "U" configuration, oriented outwards and of a considerable longitude. The third pair of tabs are established as a prolongation of the free edge of the intermediate tabs, beyond the respective folds, and with wide lateral expansions that configure four wings. These wings are considerably distanced, whose mission is to adhere through elasticity to all the system at the plane exterior base of the base part, and serving at the same time as a clearing element of an intermediate sheet or panel, when it is necessary.

The first pair of tabs, through their folds or brackets, are designed for the nailing of the plastic shaft participant in the other piece that is to be united, by its middle area. Meanwhile, the folds of the intermediate pair of tabs act by a side as a means of fastening to the borders of the window that is operatively worked in the sheet, and at the same time as a means of lateral fastening for the cited plastic shaft.

In accordance with this structure, the metallic staple is capable of elastically deforming to connect with the sheet, and after said connection it is capable of receiving, also following elastic deformation, the shaft that must be lodged in its interior.

In accordance with the characteristics of the invention, the plastic shaft incorporates an intermediate hollow area through which direct access is established, for example with a screwdriver or the like, to the creases or brackets of the first pair of tabs, in a way that through the rotation of said tool the cited tabs can be deformed elastically, in a separating direction, to liberate the frontal and central zone of the plastic shaft.

On the other hand, after the plastic shaft has become independent, and for the dismantling of the metallic staple, same results easily contractible by means of a pincer movement over the edges defined in the fastening folds of the sheet, through windows operatively carried out on the third set of tabs.

Finally, and in accordance with another of the characteristics of the invention, the plastic shaft is supplied with interior columns between which is defined the cited passage for the screwdriver or tool for the opening of the first pair of tabs. These columns are assisted by exterior reinforcement consoles, that serve at the same time as centering elements in the connection of the shaft, and that may be obtained by termo-plastic injection, a simple opening mould or with movable sides.

DESCRIPTION OF THE DRAWINGS

To complement the description that is being realised and with the aim of helping in a better understanding of the characteristics of the invention, in accordance with a preferential example of practical realisation of same, attached as an integral part of said description is a set of drawings, where, for purposes of illustration only and not intended as a definition of the limits of the invention, the following is shown.

PREFFERRED EMBODIMENT OF THE INVENTION

Figure 1:
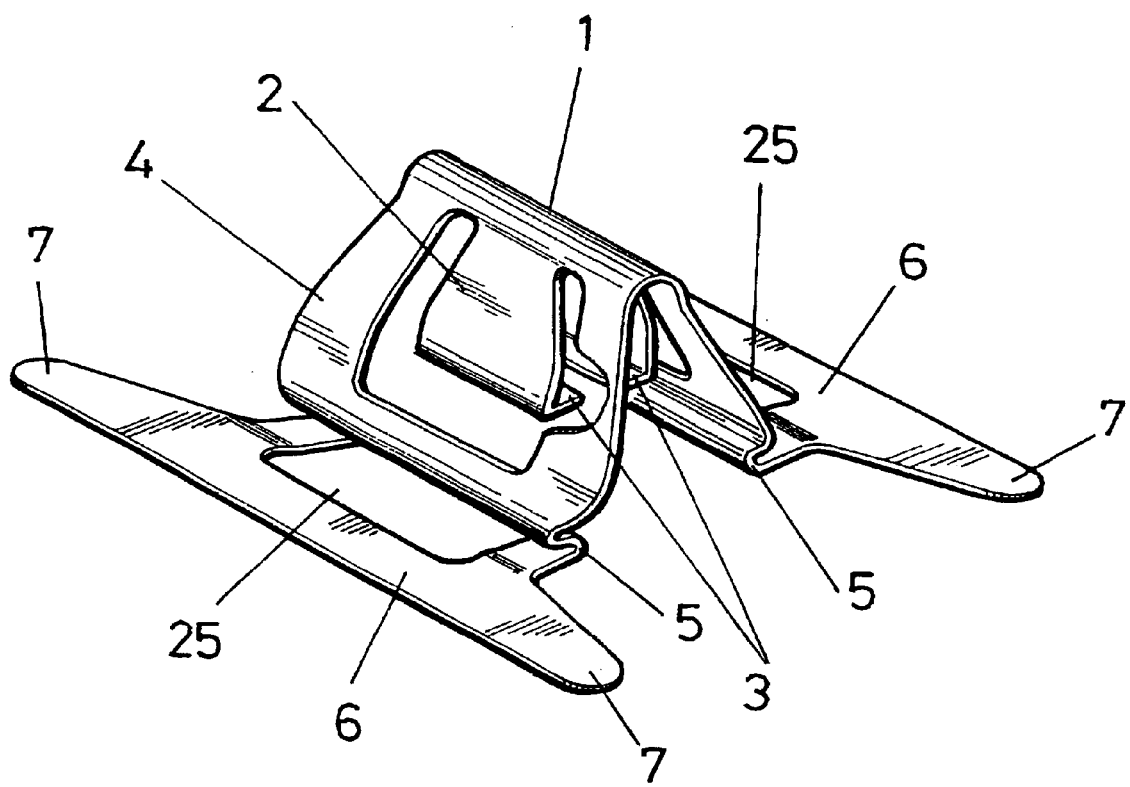
FIG. 1.—Shows, according to a view in perspective, the metallic staple that participates in the metal-plastic fastening system between pieces that constitute the object of the present invention.
Figure 2:
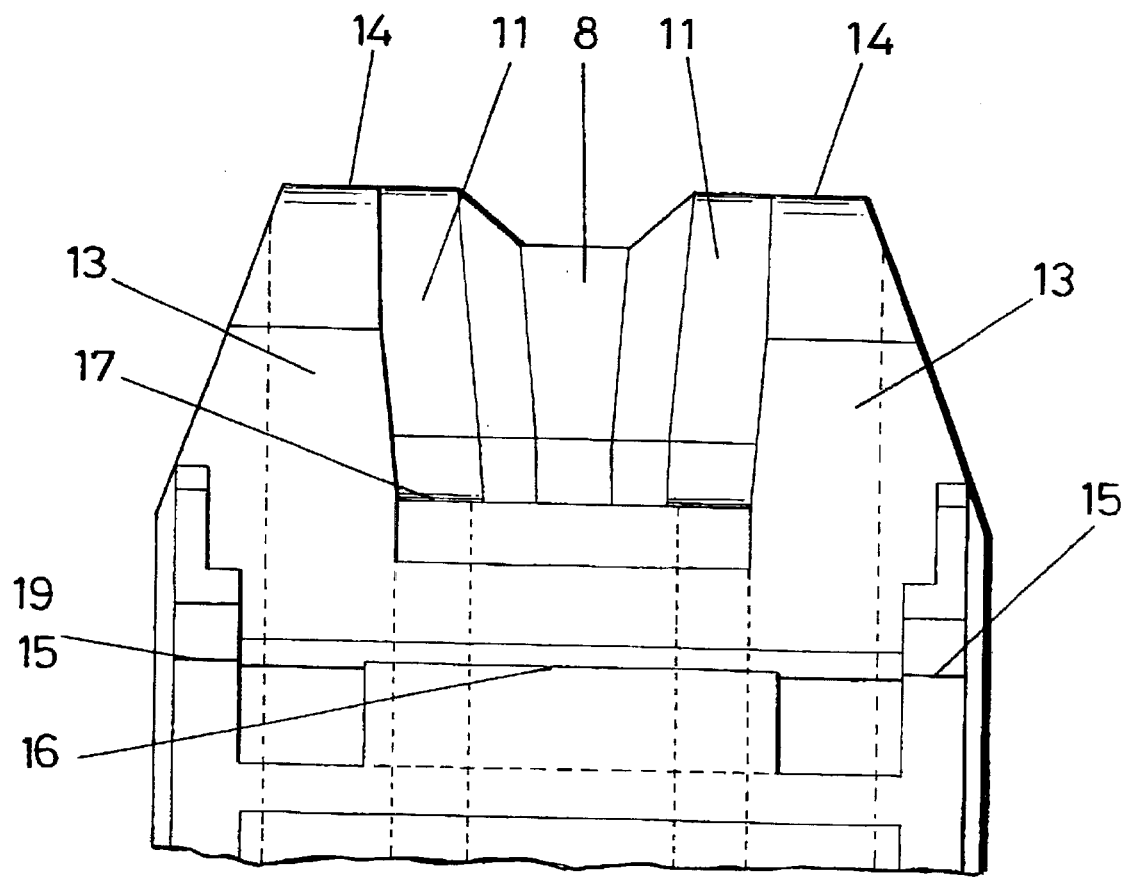
FIG. 2.—Shows an elevated view of the plastic shaft, designed to be inserted in the staple of the previous figure and that also forms part of the fastening system.

From viewing these figures we can observe how the system that the invention proposes is formed by a metallic staple, that represented in detail in FIG. 1. Parting from a central and rounded ridge (1), a first pair of tabs (2) are established, that run markedly parallel and that in their inferior and free end they each present creases or brackets (3), opposing each other, that constitute the means for the fastening of the staple to the plastic shaft, as will be seen further along.

This first pair of tabs (2) are obtained by forging at the expense of a second pair of tabs (4), that emerging equally from the rounded ridge (1), diverge substantially forming a dihedral angle inferior to 90°, finishing off these pair of tabs (4) with a symmetric configuration for the staple, with respective folds with a "U" shape configuration and concavity oriented outwards, determinant of grooves designed for the fastening of the staple to one of the parts that is to be united, concretely to the sheet, preferably which will be of metallic nature.

The second pair of tabs (4) and beyond the "U" shaped folds (5), prolong themselves in another pair of tabs (6), markedly plane, projected in contrast and supplied each of them at their free vertex with wide wings, also opposing each other, that establishes a wide support surface for the staple over the cited sheet.

The metallic staple in FIG. 1 is fixed to the sheet (8), preferably metallic, that constitutes one of the parts that is to be joined, through a window (9) operatively worked on same and dimensionally adequate so that two opposing edges of said plate (8) lodge into the folds (5) of the staple, following the elastic deformation of the intermediate pair of tabs (4), such that the extreme wings (7) of the third pair of tabs (6) of said staple adapt to the plate (8) on a wide surface, also being wide the contact zone between the edges (9) of the cited window and the folds (5) of the staple. After the assembly of the latter over the base sheet (8), in the interior of said staple a plastic shaft (10) is also connected through pressure, to which end said shaft incorporates on each side a pair of inclined ramps (11) that frame the central beam (12), in the form of an inverted "T" with a triangular core, of a bridge with support on vertical columns (13). The ridge (1) of the staple also rests on circular heads (14) of the mentioned columns (13).

The support of the plastic shaft (10) around the window (9) in which the staple is inserted is realised through the contact between the surfaces (15) and (16).

The anchorage of the metallic staple of FIG. 1 to the plastic shaft (10) is realised through the connection of the creases or brackets (3) of the tabs (2) over the inferior edges (17) of the central beam (12) in "T" form.

The columns (13) of the plastic shaft (10) are reinforced externally by consoles (18), which in its vertical section (19) serve as centering elements on the window (9) for the plate or sheet (8).

Figure 3:
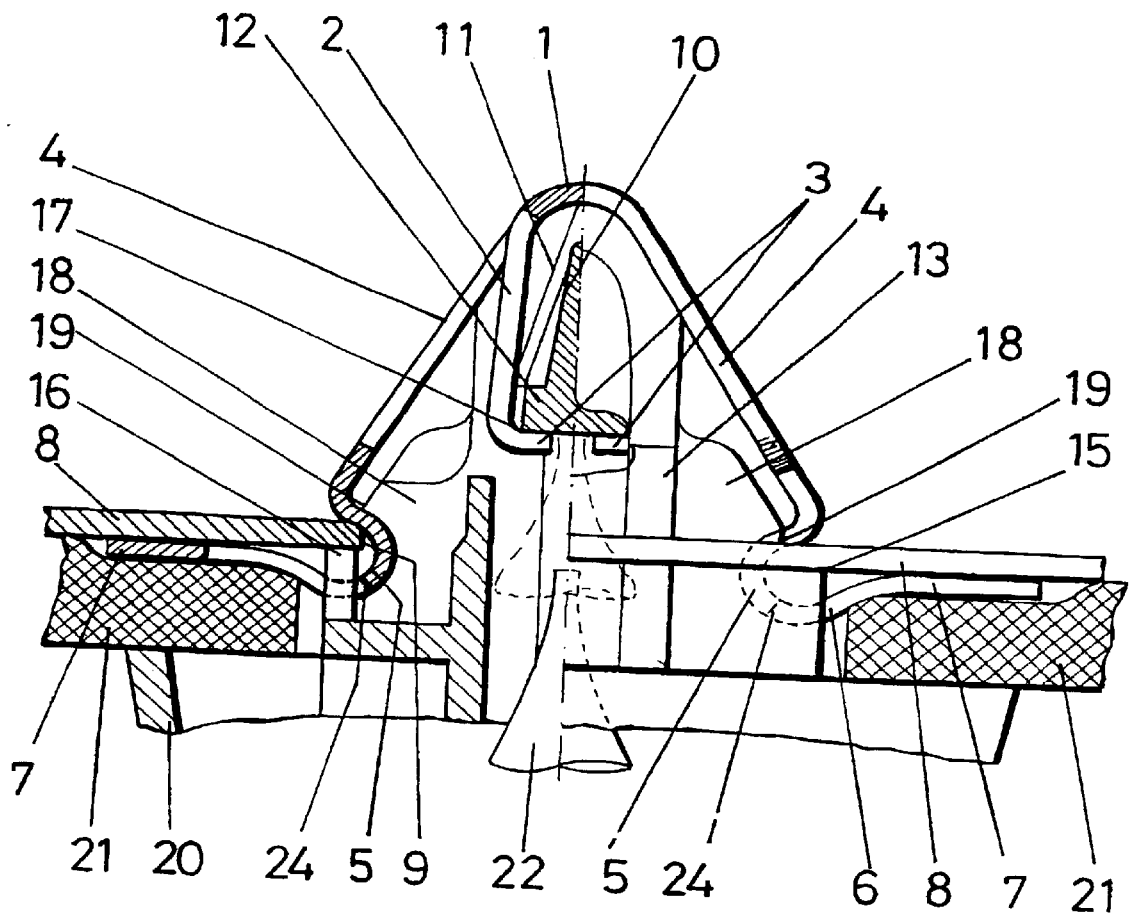
FIG. 3.—Shows, finally, a lateral elevated view, and partially cut, of the whole system as a whole, in accordance with a practical realisation example in which between two parts that are to be united is situated also an intermediate part that remains fixed to the others in a parallel way.

As has been previously stated, the part or element (20) to which is joined the plastic shaft (10) may be directly fixed to the plate (8) with the collaboration of the metallic staple of FIG. 1, or between these elements a third part (21) may be set up, for example a panel, as has been represented in FIG. 3.

In accordance with the structure described, the assembly of the different parts that integrate the system is carried out through simple connection by pressure. Meanwhile, for the dismantling it suffices to use a screwdriver (22), or similar element, with which, by way of a 90° rotation, the brackets (3) of the staple are separated, for its liberation from the beam (12) of the plastic shaft and, subsequently with a pincer movement over the edges (24) of the windows (25) set up over the third pair of tabs (6) of the metallic staple, so that said staple may be at the same time freed from the other piece, that is from the sheet like body (8).

What is claimed is:

1. A system for fastening two or more parts, wherein one of the two or more parts comprises a sheet having a window, comprising:
    a metallic staple, fixedly insertable through the window of the sheet, comprising:
        an intermediate ridge,
        a first pair of tabs, said first pair of tabs being substantially parallel, each tab being attached at a fixed end to the intermediate ridge and including a crease at a free end, each crease being opposingly and planarly positioned with respect to the other crease,
        a second pair of tabs, each tab being attached at a fixed end to the intermediate ridge such that said second pair of tabs defines a dihedral angle no greater than 90°, and each of said second pair of tabs including an U-shaped fold at a free end with an outwardly-oriented concave portion, and
        a third pair of tabs, each tab being planarly positioned with respect to the other tab and attached at a fixed end and projecting outwardly and opposingly from one of the U-shaped folds, each tab further having opposing extended portions at a free end; and
    a plastic shaft, the plastic shaft comprising one of the two or more fastened parts and being fixedly insertable in the metallic staple.

2. The system of claim 1, wherein the plastic shaft comprises:
    a centrally positioned inverted T-beam having a triangular core, said T-beam being insertable between the creases of said first pair of tabs for elastically deforming said first pair of tabs, said t-beam having lower edges which are insertably retained by the creases; and
    a pair of columns each outwardly positioned at an end of the T-beam, the pair of columns defining an access passageway for inserting a shaft removing tool.

3. The system of claim 1, wherein an intermediate part may be fastened in position between the third pair of tabs of the metallic staple and a retainer depending from the plastic shaft.

4. The system of claim 1, wherein each of the third pair of tabs further comprises a window adjacent to a u-shaped fold, each window providing access for inserting a staple removing tool.

5. The system of claim 1, wherein the plastic shaft further comprises an exterior console depending from each of the columns, the exterior consoles serving to center the plastic shaft in the window of the sheet.

* * * * *